(12) United States Patent
Carelock

(10) Patent No.: US 7,921,592 B2
(45) Date of Patent: Apr. 12, 2011

(54) STRIKE INDICATOR FOR AUTOMATIC FISHING DEVICE

(76) Inventor: Glenn Carelock, El Dorado, AR (US)

( * ) Notice: Subject to any disclaimer, the term of this patent is extended or adjusted under 35 U.S.C. 154(b) by 0 days.

(21) Appl. No.: 12/218,004

(22) Filed: Jul. 10, 2008

(65) Prior Publication Data

US 2010/0005699 A1 Jan. 14, 2010

(51) Int. Cl.
*A01K 97/12* (2006.01)
*A01K 91/10* (2006.01)
(52) U.S. Cl. .................................. 43/16; 43/17
(58) Field of Classification Search ............... 43/15–17
See application file for complete search history.

(56) References Cited

U.S. PATENT DOCUMENTS

| | | | | |
|---|---|---|---|---|
| 384,853 A * | 6/1888 | Keller | | 43/15 |
| 625,829 A * | 5/1899 | Cook | | 43/16 |
| 827,972 A * | 8/1906 | Grignon | | 43/17 |
| 840,598 A * | 1/1907 | Tuttle | | 43/15 |
| 1,132,158 A * | 3/1915 | Brewer et al. | | 43/17 |
| 1,177,885 A * | 4/1916 | Molnar | | 43/16 |
| 1,212,696 A * | 1/1917 | Schuler et al. | | 160/313 |
| 1,524,011 A * | 1/1925 | Ed Ballew | | 43/16 |
| 2,032,537 A * | 3/1936 | Kozikowski | | 43/16 |
| 2,145,929 A * | 2/1939 | Herman | | 43/17 |
| 2,195,356 A * | 3/1940 | Biddinger | | 43/17 |
| 2,283,430 A * | 5/1942 | Frettem | | 43/17 |
| 2,303,668 A * | 12/1942 | Tilbury | | 43/15 |
| 2,518,517 A * | 8/1950 | Baulski | | 43/16 |
| 2,545,385 A * | 3/1951 | Reppert et al. | | 43/15 |
| 2,554,927 A * | 5/1951 | Schultz, Jr. | | 43/16 |
| 2,577,552 A * | 12/1951 | White, Jr. | | 43/15 |
| 2,577,553 A * | 12/1951 | White, Jr. | | 43/15 |
| 2,577,554 A * | 12/1951 | White, Jr. | | 43/15 |
| 2,577,555 A * | 12/1951 | White, Jr. | | 43/15 |
| 2,606,385 A * | 8/1952 | Laurito | | 43/15 |
| 2,755,590 A * | 7/1956 | Collins | | 43/17 |
| 2,765,566 A * | 10/1956 | Waddell et al. | | 43/16 |
| 2,783,574 A * | 3/1957 | Bayes | | 43/16 |
| 2,785,493 A * | 3/1957 | Thiel | | 43/17 |
| 2,791,857 A * | 5/1957 | Schrader | | 43/16 |
| 2,813,364 A | 11/1957 | Appleman | | |
| 2,871,614 A * | 2/1959 | Roff | | 43/15 |
| 2,887,812 A * | 5/1959 | Staskiews et al. | | 43/15 |
| 2,899,768 A * | 8/1959 | Steinauer | | 43/15 |

(Continued)

FOREIGN PATENT DOCUMENTS

FR 2657752 A1 * 8/1991

(Continued)

OTHER PUBLICATIONS

Keith Sutton, "Out There: Yo-yoing for cats with 'Toothpick'," ESPN.com, http://sports.espn.go.com/espn/print?id=1420221&type=story (last visited Feb. 25, 2008).

*Primary Examiner* — Darren W Ark
(74) *Attorney, Agent, or Firm* — Nathan Price Chaney

(57) ABSTRACT

A strike indicator for a fishing device is provided. The signaling mechanism of the strike indicator is activated by a trigger. Either the trigger or the signaling mechanism is attached to a rotating component of the fishing device. An optional location beacon or fish attractor light may be incorporated into the signaling mechanism.

9 Claims, 6 Drawing Sheets

U.S. PATENT DOCUMENTS

| | | | |
|---|---|---|---|
| 2,913,845 A * | 11/1959 | Baker et al. | 43/15 |
| 2,970,400 A * | 2/1961 | Nolin | 43/17 |
| 3,015,181 A * | 1/1962 | O'Donnell | 43/17 |
| 3,037,317 A * | 6/1962 | Morrison et al. | 43/17 |
| 3,169,335 A * | 2/1965 | Nalder | 43/15 |
| 3,359,673 A * | 12/1967 | Roemer | 43/17 |
| 3,394,484 A * | 7/1968 | Sonoski | 43/16 |
| 3,453,766 A * | 7/1969 | Hunt et al. | 43/17 |
| 3,474,561 A * | 10/1969 | McConkey | 43/16 |
| 3,605,314 A * | 9/1971 | Sarns | 43/15 |
| 3,878,634 A * | 4/1975 | Quimpo | 43/15 |
| 3,950,880 A * | 4/1976 | Polaszek | 43/17 |
| 4,120,111 A * | 10/1978 | Young, Jr. | 43/17 |
| 4,340,192 A * | 7/1982 | Burris, III | 43/3 |
| 4,642,930 A * | 2/1987 | Graf | 43/17 |
| 4,651,459 A * | 3/1987 | Wurtz | 43/16 |
| 4,807,386 A * | 2/1989 | Emory, Jr. | 43/16 |
| 4,890,409 A | 1/1990 | Morgan et al. | |
| 4,907,363 A | 3/1990 | Dury | |
| 4,916,846 A * | 4/1990 | Pehm | 43/17.5 |
| 4,924,617 A | 5/1990 | Parent | |
| 4,934,090 A * | 6/1990 | Storey et al. | 43/16 |
| 5,036,615 A * | 8/1991 | Lu | 43/17 |
| 5,050,332 A | 9/1991 | Cross | |
| 5,050,333 A | 9/1991 | Debreczeni | |
| 5,109,624 A * | 5/1992 | Bryan | 43/16 |
| 5,163,243 A * | 11/1992 | Wold et al. | 43/17 |
| 5,168,651 A * | 12/1992 | Wilson | 43/17 |
| 5,199,205 A * | 4/1993 | Klammer | 43/17 |
| 5,309,663 A * | 5/1994 | Shirley | 43/15 |
| 5,351,432 A * | 10/1994 | Tse | 43/17 |
| 5,412,898 A * | 5/1995 | Crain | 43/19.2 |
| 5,483,768 A * | 1/1996 | Tessier | 43/16 |
| 5,495,688 A | 3/1996 | Sondej | |
| 5,570,534 A | 11/1996 | Ford | |
| 5,615,512 A * | 4/1997 | Wang | 43/17 |
| 5,758,449 A * | 6/1998 | Munsterman et al. | 43/17 |
| 5,813,161 A | 9/1998 | Yai | |
| 5,898,372 A * | 4/1999 | Johnson et al. | 43/17 |
| 5,974,721 A * | 11/1999 | Johnson et al. | 43/17 |
| 6,336,287 B1 | 1/2002 | Lobato | |
| 6,671,994 B1 * | 1/2004 | Klein | 43/17 |
| 6,880,285 B1 * | 4/2005 | Frost et al. | 43/15 |
| 7,047,687 B2 * | 5/2006 | Liu | 43/17 |
| 7,131,231 B1 * | 11/2006 | Lee | 43/17 |
| 7,207,133 B2 * | 4/2007 | Schiemann et al. | 43/17 |
| 7,357,343 B2 * | 4/2008 | Hoag et al. | 43/16 |

FOREIGN PATENT DOCUMENTS

| | | | |
|---|---|---|---|
| GB | 2191071 A * | 12/1987 | |
| GB | 2248161 A * | 4/1992 | |
| JP | 08009859 A * | 1/1996 | |
| JP | 09037692 A * | 2/1997 | |

\* cited by examiner

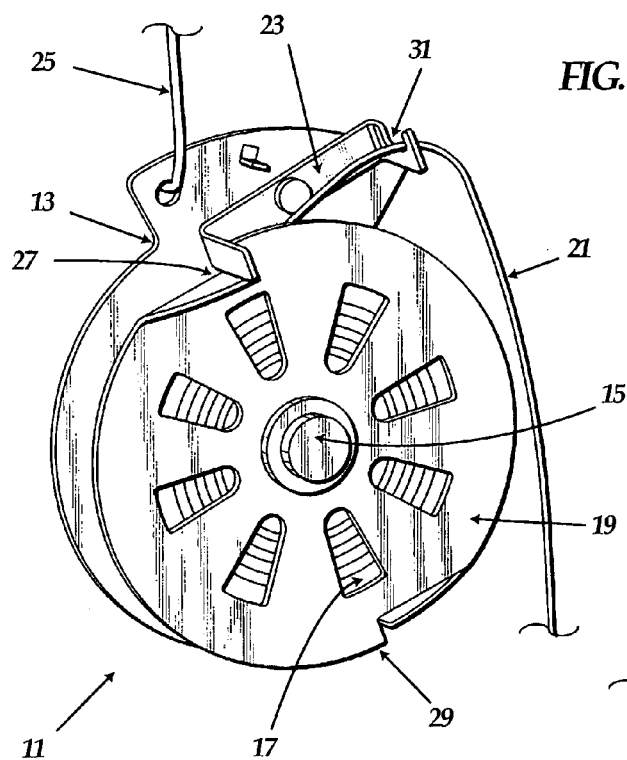
FIG. 1 - PRIOR ART
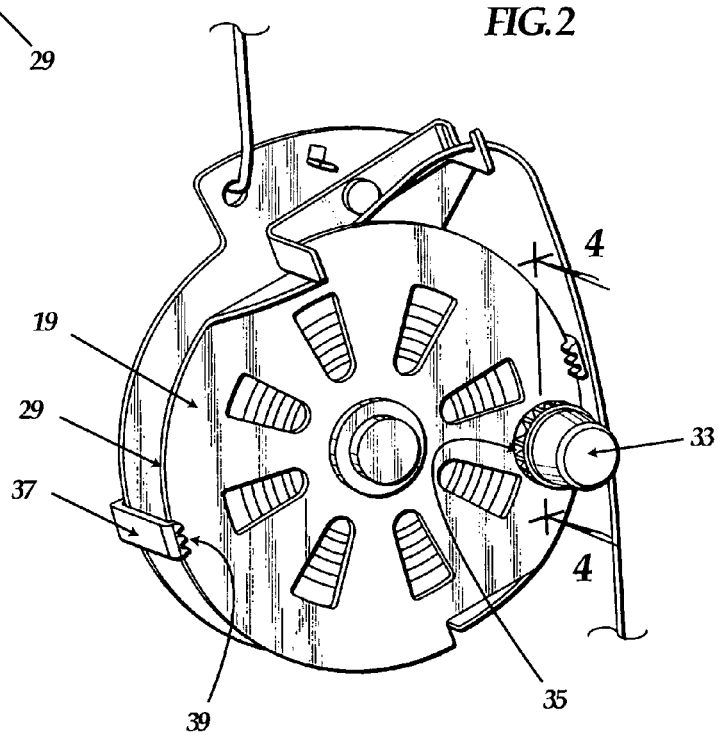
FIG. 2

STRIKE INDICATOR FOR AUTOMATIC FISHING DEVICE

CROSS REFERENCES

None.

GOVERNMENTAL RIGHTS

None.

BACKGROUND OF THE INVENTION

Many types of automatic fishing devices exist, including trotlines, limblines, jugs, and hook setters. However, each of these devices is suited for use only in specific environments. For instance, trotlines are most effective for a relatively broad expanse of water with two readily identifiable endpoints protruding from the water. Limblines are useful only in places where thin, flexible tree limbs hang over the water at a height such that the fisherman can secure the limbline to the tree. Jugs are best suited to large areas of open water to avoid lost fish due to snagging. Finally, hook setters require close supervision, as such devices are not designed to maintain tension after a fish strikes. For these reasons, perhaps the most versatile automatic fishing device is the rotary automatic fisher, one type of which is also known as a "yoyo" to many fishermen. Yoyos can be used on boats, boat docks, trees, ice fishing rigs, and just about any other location where the yoyo can be secured to an above-water object.

As useful as yoyos are, they lack a strike indicator so that the fisherman knows to check the yoyo to see if a fish is on the line or if the yoyo needs to be rebaited. Fishermen must instead individually inspect each yoyo to determine whether the yoyo has hooked a fish. It is a primary object of the invention to provide a strike indicator for a yoyo that allows a fisherman to determine whether a yoyo needs to be checked without requiring the fisherman to be in very close proximity to the yoyo.

The original yoyo is the subject of U.S. Pat. No. 2,577,552 (the "'552 patent"), issued in 1951 to J. W. White, Jr. The design disclosed in the '552 patent is still in widespread use among fishermen and is readily available. Due to the sheer number of yoyos already on the market, it is thus another object of the invention to provide a strike indicator for a yoyo that may be retrofitted to yoyos of the prior art.

U.S. Pat. No. 2,791,857 (the "'857 patent") discloses a device similar to a yoyo but that adds to the original design a rotating bar having a clapper to strike bells. An auditory signal is only useful if the fisherman is in close proximity to the device at the time the fish strikes. Notably, the '857 patent requires a separate frame to which the bells are mounted to give enough space between the rotating bar and the bells for the clapper to generate sufficient force to audibly ring the bells. For this reason, among others, the '857 patent cannot be easily retrofitted to yoyos of the prior art. Furthermore, the choice of bells for the '857 patent is unduly limiting, as the bells only ring when the line is actually retrieved into the spool of the device. The fisherman must be within earshot of the device at the time the fish strikes to work effectively, as the bells will not continue to ring after the line is fully retrieved. It is thus an object of the invention to provide a strike indicator that is functional even after the line of the automatic fishing device is fully retracted.

In many instances, fishermen use yoyos at night because many species of sporting fish actively feed at night. Thus, it is an object of the invention to provide a strike indicator that is useful at night.

U.S. Pat. No. 5,168,651 (the "'651 patent") discloses a jug-type fishing device that has, as one component, a switch to turn on a light upon a fish strike. However, the '651 patent cannot be applied to a yoyo because such patent utilizes a jug-type fishing device that relies upon buoyancy as a counterweight to a fish's tugs. Such configuration is bulky and requires open water for efficient use, and the fishing device disclosed in the '651 patent cannot easily be mounted to fixed objects. The design disclosed in the '651 patent is also problematic because the design allows the switch to be triggered multiple times if a fish tugged on the line with sufficient strength more than once. Each cycle of slack and tension would trigger the switch, thus making the signal blink on and off and rendering the device useless half of the time. Furthermore, the line itself may trigger the switch because the line is fed through the switch at a severely acute angle; such an angle places excessive stress on both the line and the switch, which could lead to failure of either component. It is thus an object of the invention to provide a strike indicator for an automatic fishing device that is reliable and consistent.

BRIEF SUMMARY OF THE INVENTION

The apparatus in accordance with the invention meets the above objectives and represents an advance in the art by providing a strike indicator for a fishing device that can signal when a fish needs to be removed or the device needs to be rebaited without requiring the fisherman to be in very close proximity to the device. The following three preferred embodiments set forth the inventor's best mode for practicing the invention.

A first preferred embodiment utilizes a signaling mechanism, such as a light-emitting diode ("LED"), coupled with a rotary switch. The rotary switch cooperates with and is mounted to the spool of an automatic fishing device. When a fish strikes, a trigger engages the rotary switch, thus activating the signaling mechanism. When used on a rotary automatic fishing device, each successive spool rotation further engages the rotary switch, thus ensuring a complete activation of the signaling mechanism.

A second preferred embodiment utilizes a signaling mechanism mounted to a binary switch. Like the first preferred embodiment, the binary switch in the second preferred embodiment is mounted to the spool of a rotary automatic fishing device, and a trigger mounted to the base of the device engages the binary switch following a fish strike. In the second preferred embodiment, however, the trigger physically actuates the switch from a first position to a second position. Following the actuation of the switch, the binary switch does not come into contact with the trigger again, which allows the spool to retract the fishing line without friction associated with the trigger engaging the binary switch.

A third preferred embodiment utilizes a different configuration than the previous two embodiments in that the signaling mechanism is mounted not to the spool, but to the base of the automatic fishing device. Such configuration provides an opportunity to add more features to the device. For example, a base-mounted signaling mechanism could easily be used to reduce the rotating mass of the spool. If necessary, the base-mounted signaling mechanism allows larger batteries to be used, which are typically less expensive and last longer than smaller, lighter watch-type batteries. A larger battery could also allow flexibility of incorporating a fish attracting light or a location beacon. Because the signaling mechanism is mounted to the base, the signaling mechanism switch protrudes from the base, where it is capable of being engaged by a trigger that is mounted to the spool of a rotary device. Thus configured, the battery can power a fish attracting light until such time as a fish strikes the device. When a fish strikes, the fish attractor light may be automatically switched off and the strike indicator switched on; if utilized, this configuration could conserve battery time for use by the strike indicator.

Any of these three preferred embodiments may be retrofitted to existing fishing devices, including a rotary automatic fisher of the prior art. These and other advantages will become apparent from the following detailed description which, when viewed in light of the accompanying drawings, disclose the embodiments of the invention.

BRIEF DESCRIPTION OF THE DRAWINGS

FIG. 1 is a front perspective view of an automatic fisher of the prior art.

FIG. 2 is a front perspective view of the first preferred embodiment of the invention in the set position.

LISTING OF COMPONENTS

Figures 3, 4:
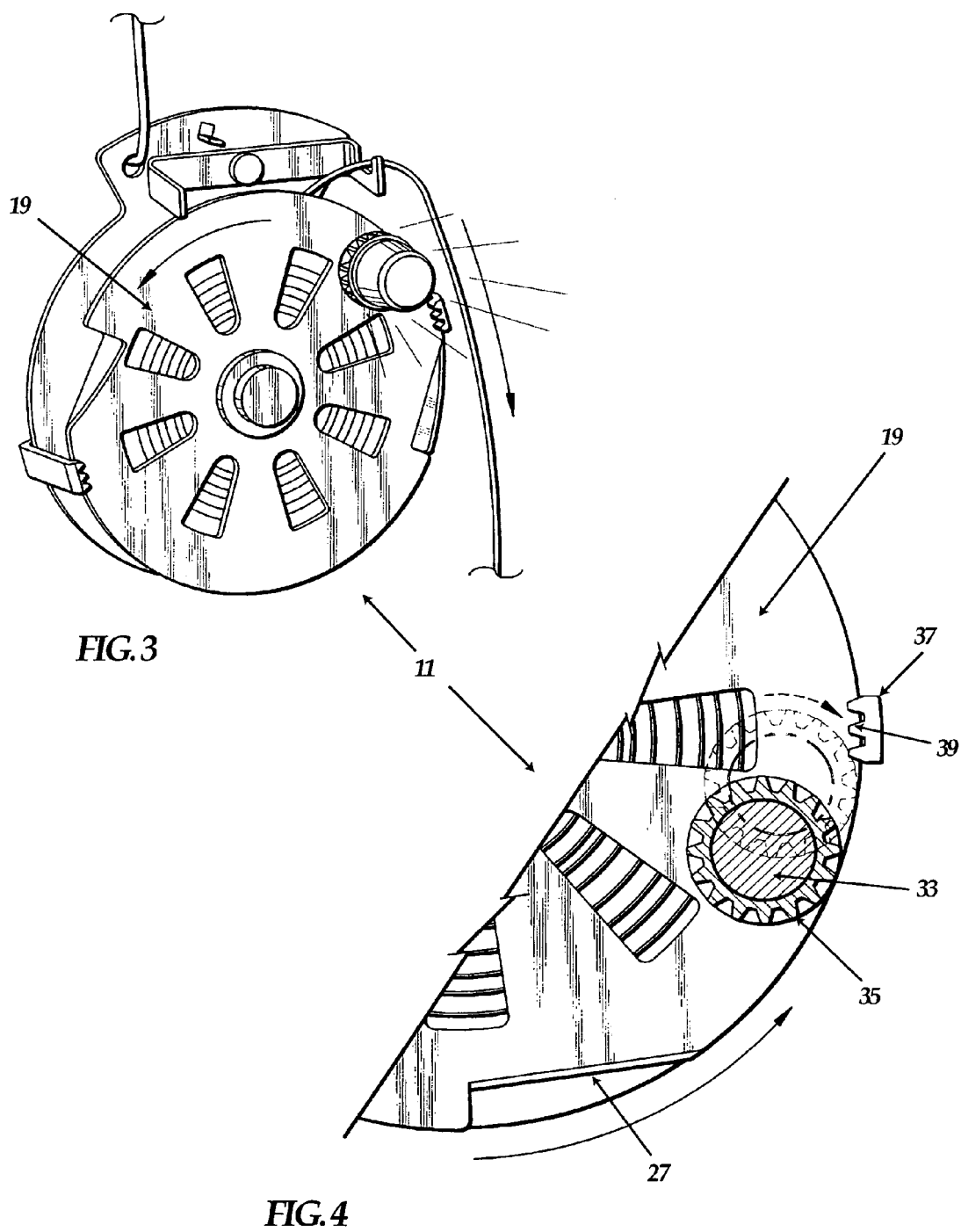
FIG. 3 is a front perspective view of the first preferred embodiment of the invention in the triggered position.
FIG. 4 is a front view showing the activation of the rotary switch signaling mechanism utilized in the first preferred embodiment of the invention.

11—yoyo
13—base
15—spindle
17—spring
19—spool
21—fishing line
23—latch
25—securing means
27—notch
29—lip
31—aperture
33—signaling mechanism
35—cogs
37—trigger
39—teeth
41—binary signaling mechanism
43—lever
45—multiway signaling mechanism
47—on/off switch
49—strike indicator switch
51—set position signal
53—strike signal
55—battery
57—housing

DETAILED DESCRIPTION OF THE INVENTION

The apparatus in accordance with the invention meets the above objectives and represents an advance in the art by disclosing a signaling mechanism for a fishing device that provides a strike indicator following a fish strike. In several embodiments, the invention may be constructed by retrofitting a small number of components to a fishing device of the prior art, or the device may be sold as a complete unit.

As shown in FIG. 1, a fishing device, or yoyo, 11 has four basic parts: a base 13 with a spindle 15, a spring 17, a spool 19 that is rotatable around the spindle 15 for storing a length of fishing line 21, and a latch 23 pivotally attached to base 13. In order to set yoyo 11, yoyo 11 is mounted to a fixed object using sufficient securing means 25, such as heavy twine. Fishing line 21 is drawn from spool 19, which tensions spring 17. Once the desired length of fishing line 21 has been lowered into the water, latch 23 pivots to communicate with a notch 27 in the outer lip 29 of spool 19. Thus secured, latch 23 prevents spring 17 from winding spool 19. Yoyo 11 is then said to be in the "set position" and can be baited and left unattended.

When a fish strikes the bait at the end of fishing line 21, the fish draws an amount of fishing line 21 out of spool 19. Because fishing line 21 is routed through an aperture 31 in latch 23, the tension on fishing line 21 applies force to latch 23 that causes latch 23 to pivot away from notch 27, thus "tripping" the yoyo 11. With latch 23 pivoted away from notch 27, the tension previously established in spring 17 winds fishing line 21 back into spool 19, and this cycle continues until the fish tires, allowing the device to retract fishing line 21 and retrieve the fish.

The first preferred embodiment is shown in FIGS. 2-4. As seen in FIG. 2, a signaling mechanism 33 is mounted to spool 19. Signaling mechanism 33 has one or more cogs 35. One or more triggers 37 is mounted to base 13, and trigger 37 is generally C-shaped. Trigger 37 spans the gap between the generally parallel, planar surfaces of base 13 of spool 19, and trigger 37 has teeth 39 oriented towards spindle 15 in a direction substantially parallel to the plane of spool 19. As shown in FIGS. 3-4, when yoyo 11 is tripped, spool 19 winds and the rotary force generated by spring 17 causes teeth 39 to engage cogs 35, which activates signaling mechanism 33.

The first preferred embodiment may be utilized to determine both the location of yoyo 11 and also whether a strike has taken place. By adding a variable resistance feature to signaling mechanism 33 (thus having a variable resistance signaling mechanism), such as a dial-type electrical switch in which voltage is determined by the rotational position of the switch, a relatively low voltage can be applied to signaling mechanism 33 (e.g., an LED light) when yoyo 11 is in the set position. A low voltage conserves battery life and is thus desirable for use with the set position. A fish strike could trip the yoyo 11 and cause successive rotation of signaling mechanism 33, which increases the voltage to signaling mechanism 33. Simply put, the amount of voltage to signaling mechanism 33 may be a function of the amount of rotation applied to signaling mechanism 33. Again using an LED light as an example, the light would be much brighter following several rotations of spool 19, which occurs after a fish strike.

In some retrofit applications, notch 27 may protrude from the generally flat, planar surface of spool 19. In such retrofit applications, care must be taken so that trigger 37 does not interfere with the rotation of spool 19 as notch 27 passes trigger 37.

Figure 5:
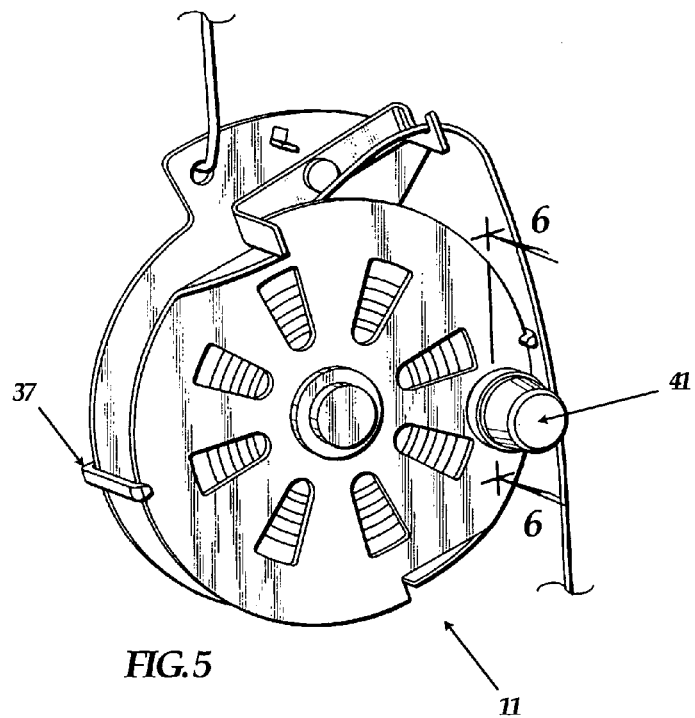
FIG. 5 is a front perspective view of the second preferred embodiment of the invention in the set position.
Figure 6:
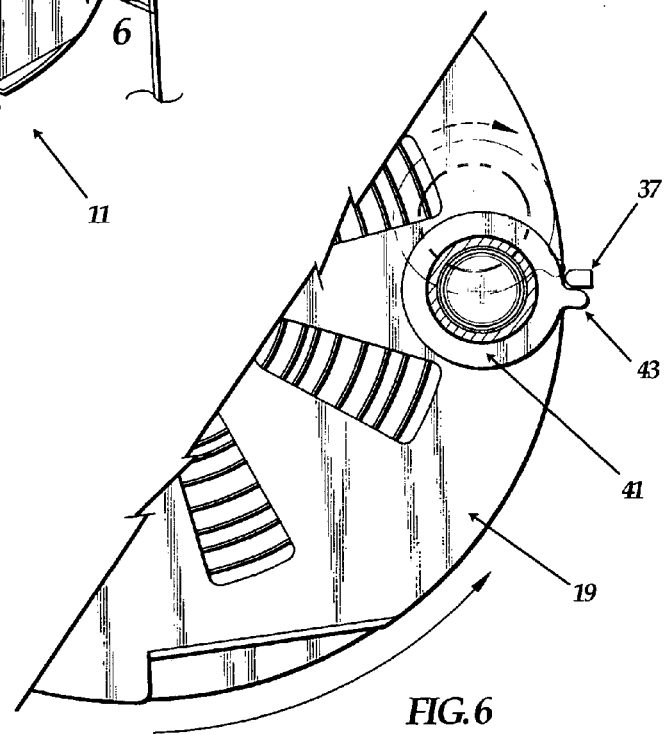
FIG. 6 is a front view showing the activation of the binary signaling mechanism utilized in the second preferred embodiment of the invention.
Figure 7:
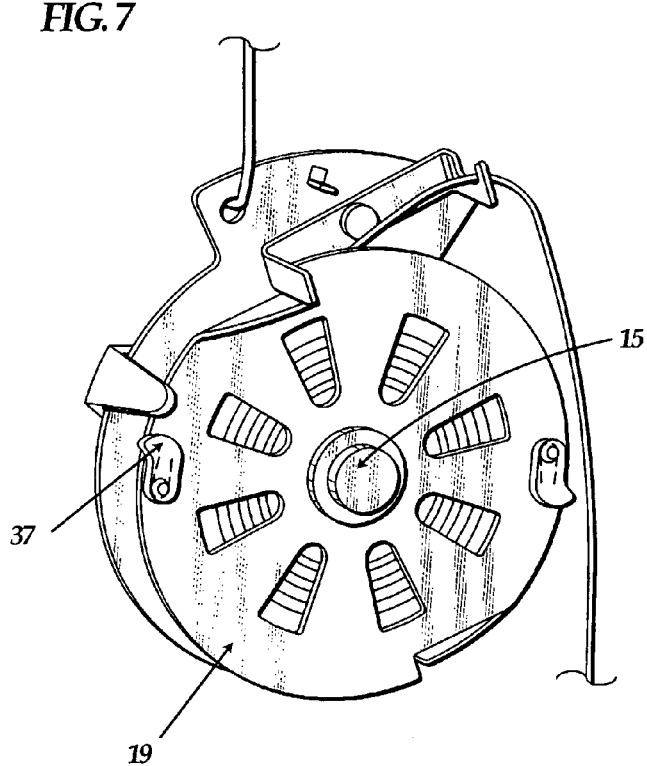
FIG. 7 is a front perspective view of the third preferred embodiment of the invention in the set position.
Figure 8:
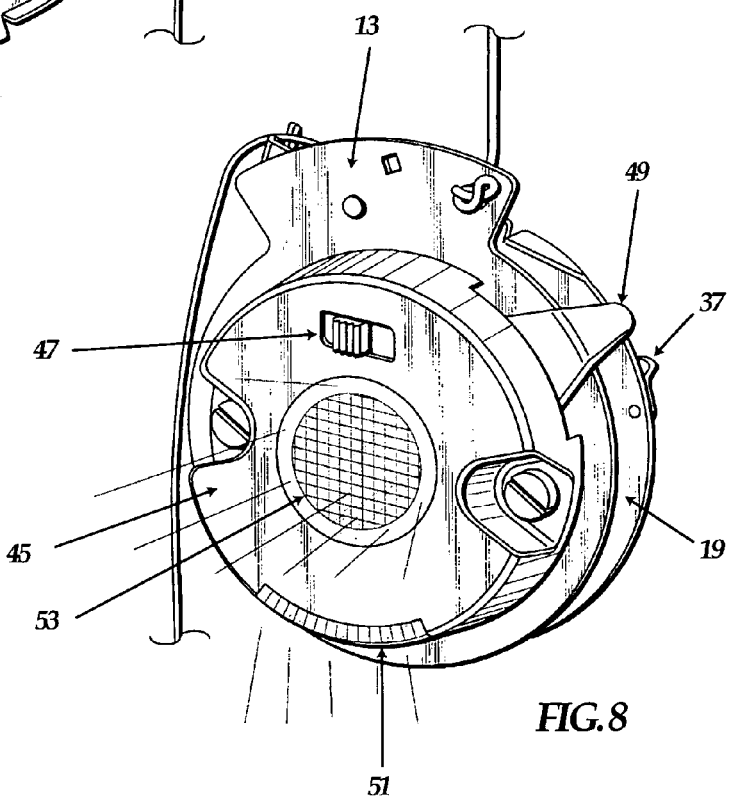
FIG. 8 is a rear perspective view of the third preferred embodiment of the invention in the set position.
Figure 9:
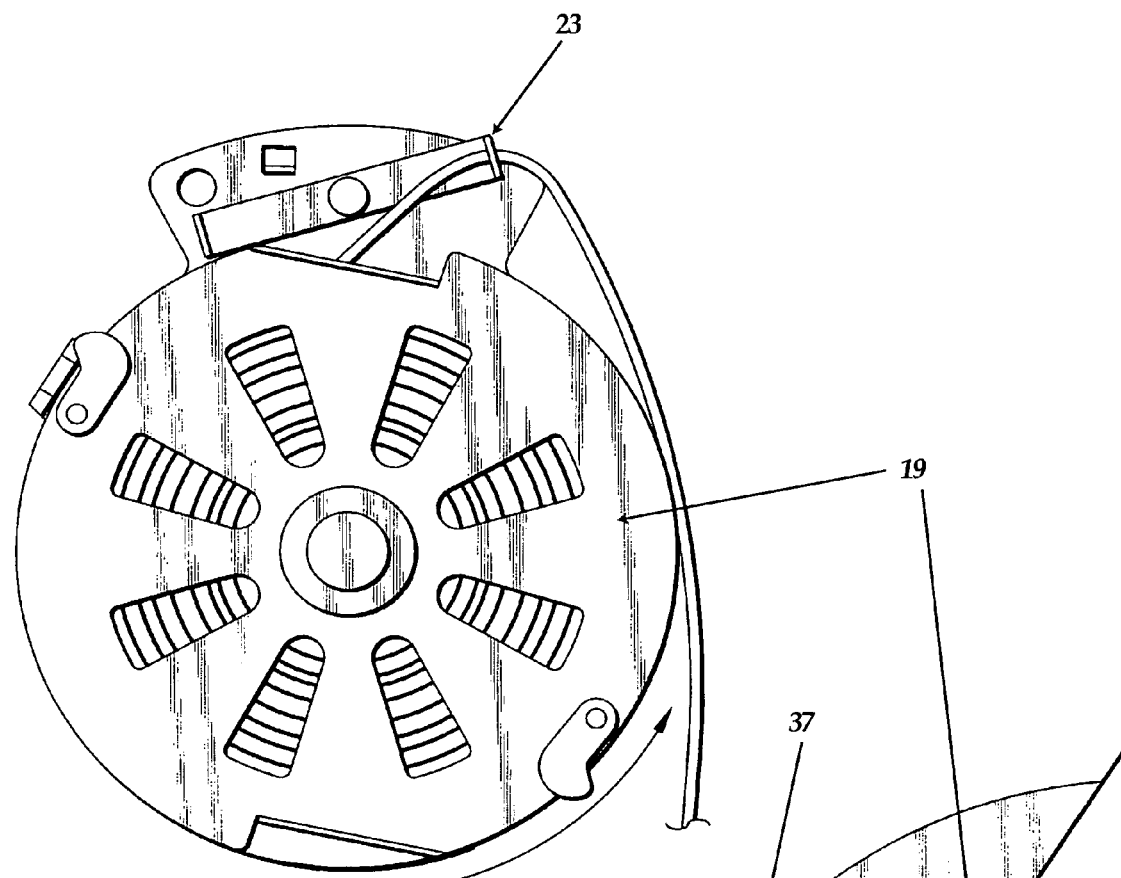
FIG. 9 is a front view showing the activation of the multiway signaling mechanism utilized in the third preferred embodiment of the invention.
Figure 10:
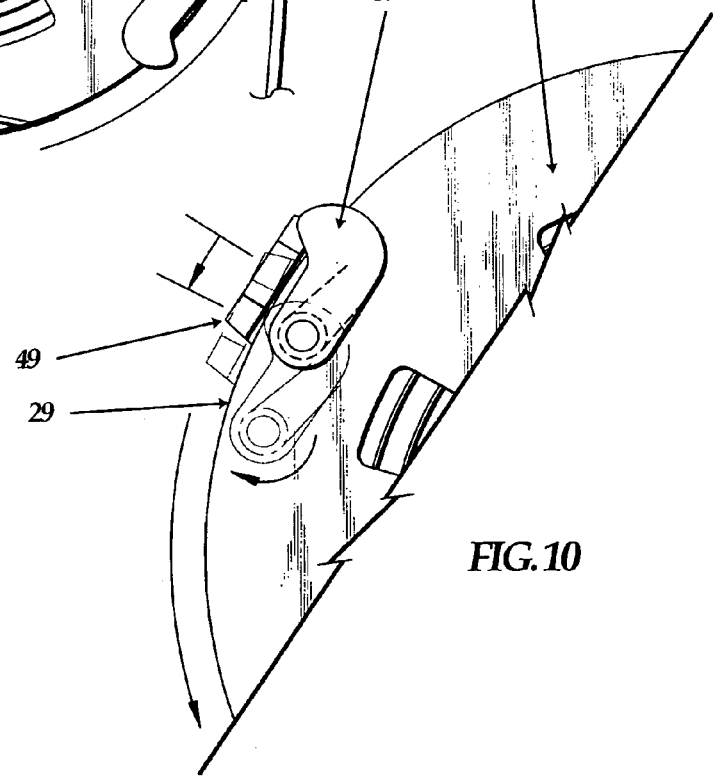
FIG. 10 is a cut-away view showing the activation of the multiway signaling mechanism utilized in the third preferred embodiment of the invention.

The second preferred embodiment is shown in FIGS. 5-6. The second preferred embodiment utilizes a binary signaling mechanism 41. That is, binary signaling mechanism 41 for the second preferred embodiment is in either an "on" position or an "off" position. When yoyo 11 is baited and placed in the set position, binary signaling mechanism 41 is placed in the "off" position. As spool 19 rotates following a fish strike, however, one or more triggers 37 engages a lever 43 on binary signaling mechanism 41, thus moving binary signaling mechanism 41 to the "on" position. Further, once binary signaling mechanism 41 has been switched on, lever 43 will not engage trigger 37 until binary signaling mechanism 41 has been reset by the fisherman. That is, spool 19 may rotate freely without interference between lever 43 and trigger 37.

The third preferred embodiment is shown in FIGS. 7-12. As shown in FIGS. 7-10, a multiway signaling mechanism 45 is mounted to base 13 opposite spindle 15. One or more triggers 37 are mounted to spool 19. Multiway signaling mechanism 45 has an on/off switch 47 and a strike indicator switch 49. In the set position, strike indicator switch 49 completes an electrical circuit for a set position signal 51. Upon a fish strike, strike indicator switch 49 simultaneously opens the electrical circuit to set position signal 51 and closes an electrical circuit for a strike signal 53.

The inventor contemplates several configurations of trigger 37 and strike indicator switch 49. For example, in FIG. 10, strike indicator switch 49 is movable in a direction tangent to the rotation of spool 19. When not engaged with strike indicator switch 49, trigger 37 extends beyond lip 29 of spool 19. Trigger 37 is spring-loaded and capable of pivoting away from lip 29 such that trigger 37 does not extends beyond lip 29 of spool 19 after strike indicator switch 49 has closed the circuit with strike signal 53. The tension force required to pivot trigger 37 is more than the force required to close strike indicator switch 49, but not so great as to impede free rotation of spool 19 when trigger 37 contacts strike indicator switch 49 after strike indicator switch 49 has closed the circuit with strike signal 53.

Figure 11:
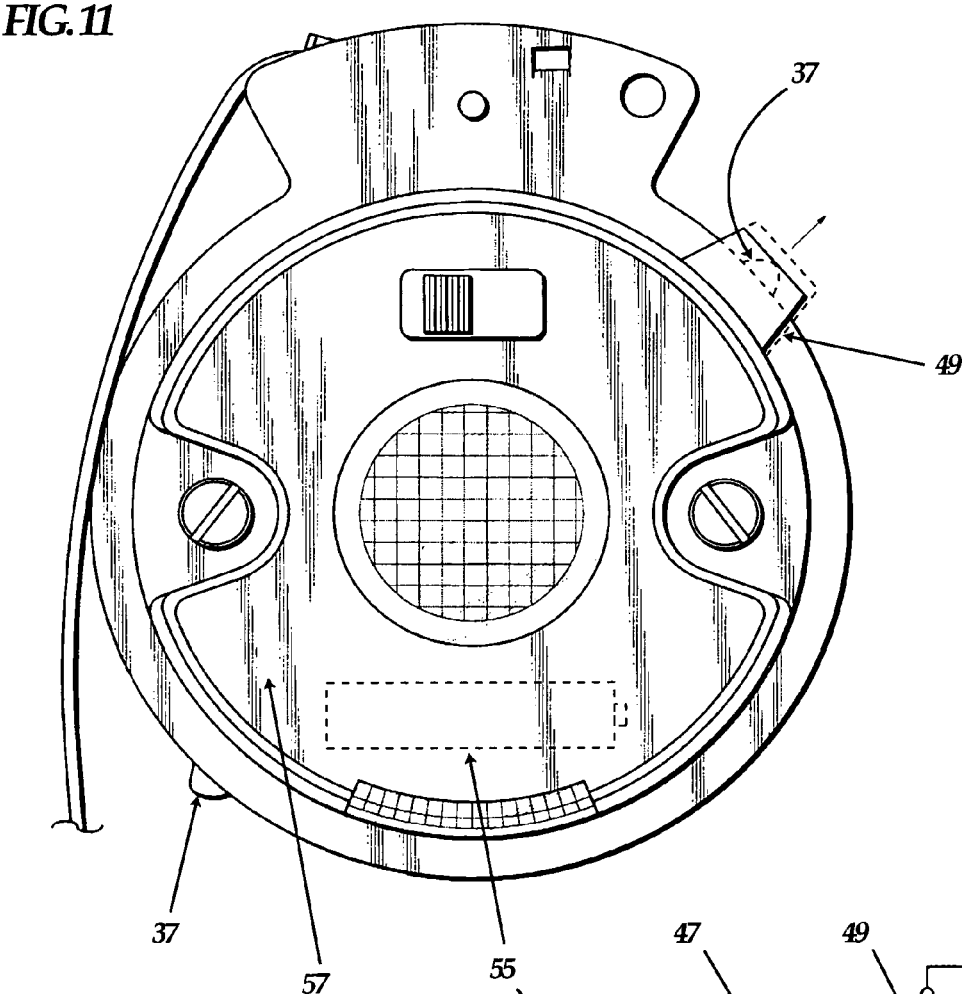
FIG. 11 is a rear perspective view of the third preferred embodiment of the invention in the off position.

Another example of a configuration of trigger 37 and strike indicator switch 49 is shown in FIG. 11. Instead of pivoting, trigger 37 is securely mounted to spool 19 (not shown in FIG. 11's rear view). When trigger 37 engages strike indicator switch 49, strike indicator switch 49 moves in a direction normal to the rotation of spool 19. Once strike indicator switch 49 has closed the circuit with strike signal 53, spool 19 may rotate without trigger 37 engaging strike indicator switch 49.

FIG. 11 also demonstrates the need for a battery 55 to be sealed within a housing 57, as yoyos 11 are used in marine environments conducive to water contamination, rust, and corrosion.

Figure 12:
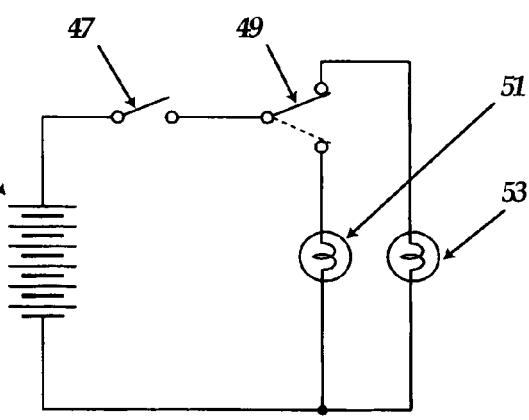
FIG. 12 is a circuit diagram of the third preferred embodiment of the invention.

FIG. 12 is a circuit diagram showing generally the operation of the third preferred embodiment. On/off switch 47 is used to activate multiway signaling mechanism 45 when in use and to conserve battery 55 when multiway signaling mechanism 45 is not in use. In a first position, strike indicator switch 49 closes an electrical circuit that powers set position signal 51. Likewise, in a second position, strike indicator switch 49 closes an electrical circuit that powers strike signal 53. Strike indicator switch 49 is only operable when on/off switch 47 is in the "on" position such that the electrical circuit is closed.

Optionally, set position signal 51 may be configured in several different ways. The inventor contemplates that the set position signal 51 could be a green location beacon which indicates the yoyo 11 is in the set position. The inventor also contemplates that the set position signal 51 could be a white fish attracting light pointed towards the water, which would increase the efficacy of yoyo 11. A combination location beacon and fish attracting light is yet another configuration of set position signal 51. In each of these examples, an LED light is preferred for use as set position signal 51 due to the substantially lower power requirements of an LED light than an incandescent bulb.

Also optionally, strike signal 53 can be configured in several different ways. As a first example, strike signal 53 can be implemented as a red light, preferably an LED for low power consumption, which signals that yoyo 11 requires attention. Another configuration of strike signal 53 recognizes that many fishermen own handheld, short distance, two-way radios. Thus, strike signal 53 can be implemented as a radio transmission capable of being received by such two-way radios. The use of radio signals has the advantage of extending the range of strike signal 53 beyond line of sight.

The radio transmission implementation of strike signal 53 can be as simple as a single intermittent tone. However, since the placement of a large number of yoyos 11 may oftentimes preclude all yoyos from being seen at the same time, it is advantageous to have a unique identifier for each yoyo 11. Strike signal 53 implemented with radio signals allows for such identification. For instance, the use of a DIP switch (a group of manual electric switches in a standard dual inline package) on each yoyo 11 allows each yoyo 11 to carry a unique identifier. For instance, a five-switch DIP switch can easily be used to identify ten yoyos 11 in Morse code, as each numeral in Morse code has exactly five dashes or dots. Using slightly more sophisticated but readily available components, the radio transmission can comprise a voice recording which states, "Check yoyo X," where X is a unique identifier for each yoyo 11.

The inventor contemplates a retrofit application of the invention in which base 13 and spool 19 are cleaned with an included alcohol swab. In either the first or second preferred embodiment, signaling mechanism 33 or binary signaling mechanism 41, respectively, is then secured to spool 19 using an adhesive. Trigger(s) 37 are mounted to base 13, also using an adhesive. Similarly, a retrofit application of the third preferred embodiment of the invention involves securing multiway signaling mechanism 45 to base 13 using an adhesive. Trigger(s) 37 are mounted to spool 19, also using an adhesive.

While the inventor has described above what he believes to be the preferred embodiments of the invention, persons having ordinary skill in the art will recognize that other and additional changes may be made in conformance with the spirit of the invention and the inventor intends to claim all such changes as may fall within the scope of the invention.

I claim:

1. A fishing device comprising:
   a substantially planar base;
   a spindle attached to the base and projecting from the base in a direction substantially normal to the plane of the base;
   a spool that is rotatable around the spindle;
   a spring that tensions the spool;
   a latch pivotally attached to the base, wherein the latch has a first position for selectably engaging the spool to prevent the spool from rotating under tension exerted by the spring and a second position for allowing the spool to rotate under tension exerted by the spring;
   a signaling mechanism mounted to the base, the signaling mechanism further comprising an electrical circuit with a switch, the signaling mechanism capable of emitting a strike signal when the electrical circuit is closed by actuation of the switch; and a trigger mounted to the spool, wherein the trigger rotates with the spool to actuate the signaling mechanism by engaging and actuating the switch to thereby close the electrical circuit and emit the strike signal when the spool rotates following movement of the latch from the first position to the second position.

2. The fishing device of claim 1, wherein the signaling mechanism further comprises a set position signal.

3. The fishing device of claim 1, wherein the signaling mechanism further comprises a set position signal, and wherein the set position signal consists essentially of an LED light.

4. The fishing device of claim 1, wherein the strike signal consists essentially of an LED light.

5. The fishing device of claim 1, wherein the strike signal consists essentially of a radio signal.

6. A fishing device comprising:
a substantially planar base;
a spindle attached to the base and projecting from the base in a direction substantially normal to the plane of the base;
a spool that is rotatable around the spindle;
a spring that tensions the spool;
a latch pivotally attached to the base, wherein the latch has a first position for selectably engaging the spool to prevent the spool from rotating under tension exerted by the spring and a second position for allowing the spool to rotate under tension exerted by the spring;
a signaling mechanism mounted to the base, the signaling mechanism further comprising an electrical circuit with a switch, the signaling mechanism capable of emitting a set signal before actuation of the switch and a strike signal when the electrical circuit is closed by actuation of the switch, wherein the signaling mechanism emits the set signal prior to being actuated and emits the strike signal after being actuated; and
a trigger mounted to the spool, wherein the trigger rotates with the spool to actuate the signaling mechanism by engaging and actuating the switch to thereby close the electrical circuit and emit the strike signal when the spool rotates following movement of the latch from the first position to the second position.

7. The fishing device of claim 6, wherein the set signal is not emitted after the signaling mechanism is actuated.

8. The fishing device of claim 6, wherein the set signal is not emitted after the signaling mechanism is actuated to emit the strike signal.

9. The fishing device of claim 6, wherein the switch of the signaling mechanism moves in a direction normal to an axis of the spindle about which the spool rotates such that the trigger does not engage the signaling mechanism after the signaling mechanism has been activated.

* * * * *